United States Patent [19]
Idogaki et al.

[11] Patent Number: 4,984,463
[45] Date of Patent: Jan. 15, 1991

[54] TWO-DIMENSIONAL ACCELERATION SENSOR

[75] Inventors: Takaharu Idogaki; Ikuo Hayashi, both of Okazaki; Toshihisa Ishihara, Nishio; Hideo Inoue, Ashigarakami; Tatsuo Sugitani, Mishima, all of Japan

[73] Assignees: Nippon Soken, Inc.; Toyota Jidosha Kabushiki Kaisha, both of Toyota, Japan

[21] Appl. No.: 412,494

[22] Filed: Sep. 26, 1989

[30] Foreign Application Priority Data

Sep. 28, 1988 [JP] Japan ............................. 63-243136
Feb. 3, 1989 [JP] Japan ................................. 1-25994

[51] Int. Cl.$^5$ ........................................... G01P 15/08
[52] U.S. Cl. ............................... 73/516 R; 73/517 A
[58] Field of Search ............. 73/516 R, 517 R, 517 A, 73/DIG. 3

[56] References Cited

U.S. PATENT DOCUMENTS 4,922,753 5/1990 Idogaki et al. ..................... 73/516 R

FOREIGN PATENT DOCUMENTS 60-133370 7/1985 Japan .
62-163972 7/1987 Japan .

*Primary Examiner*—John Chapman
*Attorney, Agent, or Firm*—Cushman, Darby & Cushman

[57] ABSTRACT

An acceleration sensor for detecting an acceleration in a plane, and having a housing, and a disk magnet arranged in a magnetic fludi stored in the housing. The movement of disk magnet is limited, i.e., a translational movement or rotational movement thereof can occur only in the plane, by projections formed in the housing, between which projections portions of the magnetic fluid having an increased density are formed adjacent to the poles of the disk magnet so that only a translational movement is allowed, or by small circumferential walls between the housing and the disk magnet and radial projections formed between end walls of the housing and disk magnet so that only a rotational movement is allowed. A Hall element issues a signal corresponding to a position of the disk magnet, to thereby determine the acceleration rate.

11 Claims, 11 Drawing Sheets

Fig. 16a
Fig. 16b
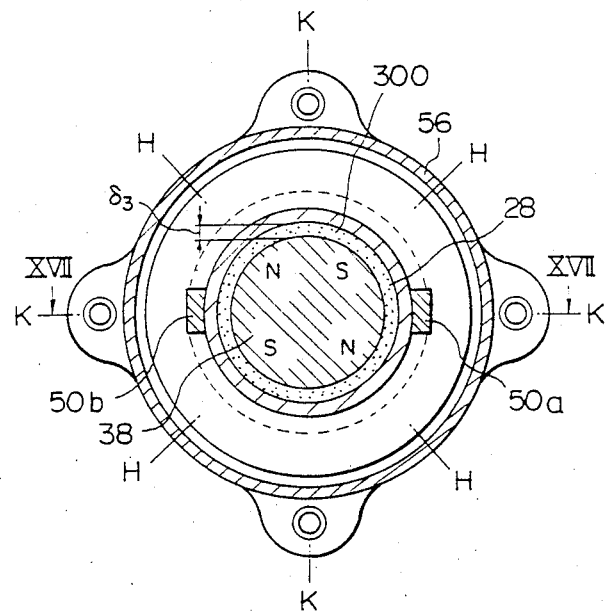
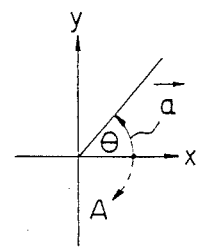
Fig. 17
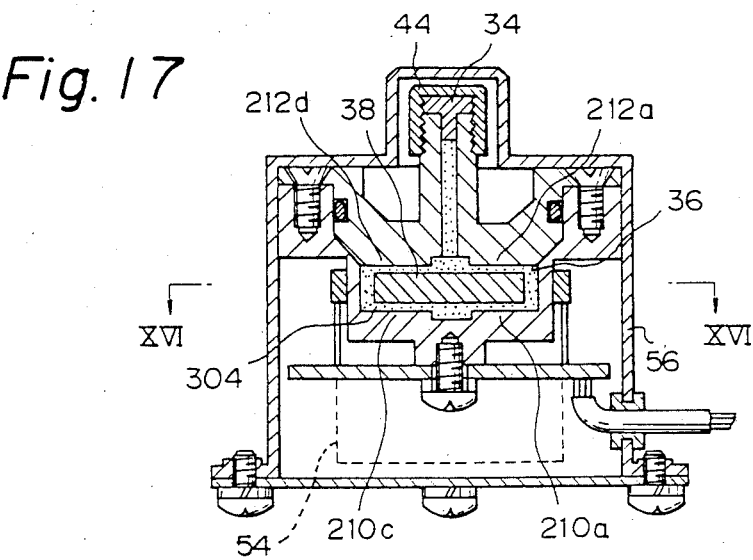

TWO-DIMENSIONAL ACCELERATION SENSOR

BACKGROUND OF THE INVENTION

1. Field of the Invention

The present invention relates to a sensor for detecting acceleration in two-dimensions, particularly to a two-dimensional acceleration sensor used for detecting acceleration along two axes, i.e., forward and backward movements and left and right movements of a vehicle. This sensor is adapted for use in a collision device for a driver, or a four wheel steering device, or a device for controlling the height of the vehicle body.

2. Description of the Related Art

Known in the prior art, for example, in Japanese Unexamined Patent Publication No. 62-163972, is a sensor for detecting acceleration along two axes. This prior art is provided with two spherical shells, i.e., an inner shell and an outer shell, and a magnetic fluid is sealingly introduced into a space between the shells. An electro-magnetic means is provided for each axis, and thus the inner shell is floatingly held inside the outer spherical shell. A contact type potentiometer is provided for detecting the position of the inner shell, which varies in accordance with the acceleration of the vehicle.

This prior art suffers from a drawback in that the construction is mechanically complicated, because a contact type sensor is utilized, and the life of the sensor is relatively short.

SUMMARY OF THE INVENTION

An object of the present invention is to provide a two-dimensional acceleration sensor capable of detecting an acceleration in two-dimensions without the provision of a contact or sliding portion therein.

According to the present invention, a sensor for the detection of an acceleration is provided, which sensor comprises:

a housing made of a non-magnetic material and defining therein a chamber having a substantially tubular shape, the housing being provided with a circumferential wall and axially spaced side walls;

a magnetic fluid stored in the tubular space of the chamber;

a disk-shaped permanent magnet arranged in the tubular chamber, the disk magnet defining a circumferential outer wall and axially spaced side walls, and having pole portions angularly spaced along the circumferential wall and side walls;

magnetic sensor means fixedly mounted on the housing for detecting a change in a magnetic flux from opposite poles of the magnetic member caused by a movement of the disk magnet in the housing;

the magnetic sensor means sensing a position of the magnet disk where the inertia of the disk magnet generated by the acceleration is balanced by a magnetic viscous elastic force of the magnetic fluid in the space between the facing circumferential walls of the disk and the chamber;

the spacing between the facing axial side walls of the disk magnet and the chamber being such that axial movement of the disk magnet is substantially blocked, and:

means for limiting the movement of the disk magnet so that substantially only a kind of movement of the disk magnet relative to the housing in the plane of the disk can be obtained when an acceleration takes place, thereby enabling a precise detection of the rate of acceleration.

BRIEF DESCRIPTION OF THE DRAWINGS

FIG. 16a is a lateral cross sectional view of the sensor device according the fourth embodiment of the present invention, taken along the line XVI—XVI in FIG. 17;

FIG. 16b shows the plane in which an acceleration takes place, which corresponds to the plane of the disk magnet in FIG. 16a;

FIG. 17 is a longitudinal cross sectional view taken along the line XVII—XVII in FIG. 16a;

FIGS. 18 and 19 are perspective views showing the main housing and sub housing, respectively, in the fourth embodiment of FIG. 16a;

FIG. 20 is a view of the control circuit for the fourth embodiment of FIG. 16a;

DESCRIPTION OF THE PREFERRED EMBODIMENTS

Figure 1A:
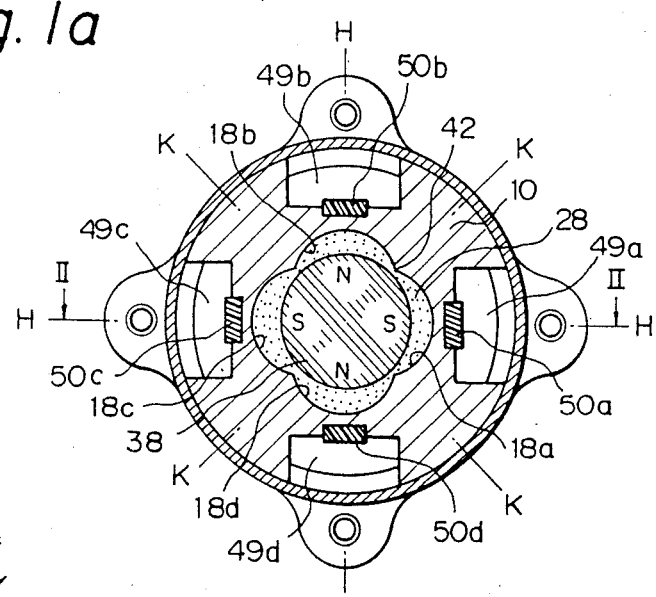
FIG. 1a is a lateral cross sectional view of the sensor device according the first embodiment of the present invention, taken along the line I—I in FIG. 2.
Figure 2:
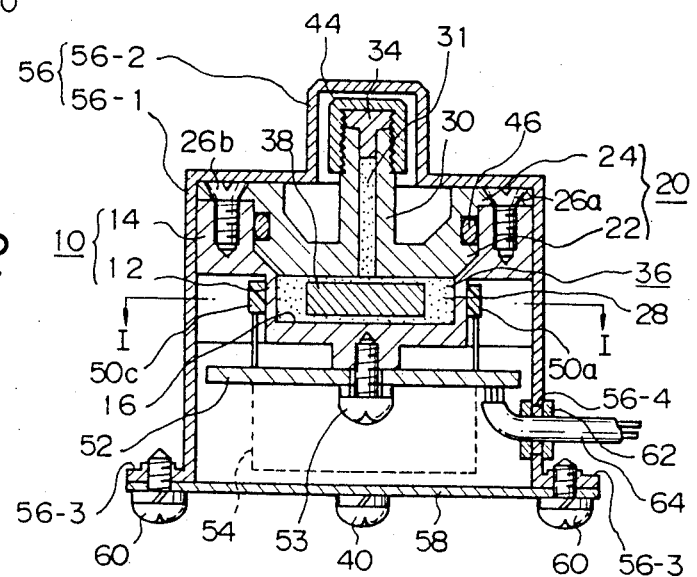
FIG. 2 is a longitudinal cross sectional view taken along the line II—II in FIG. 1.

The embodiments of the present invention now will be described with reference to the attached drawings. In FIGS. 1a and 2 showing a first embodiment of the present invention, 10 denotes a main housing made of an aluminum material, as a non-magnetic material. The main housing 10 includes a tubular portion 12 and a flange portion 14 formed integrally with the tubular portion 12. The tubular portion 12 is closed at one end thereof remote from the flange portion 14. The housing 10 forms a circular outwardly opened recess 16 defining a circular inner wall in which are formed four equiangularily spaced recesses 18a, 18b, 18c, and 18d having an arc-shaped cross-section in the plane transverse to the axis of the device. Two diametrically opposite sets of the recesses 18a and 18c, and 18b and 8d are provided. A sub-housing 20 is made of aluminum material and has a tubular portion 22 and an annular flange portion 24 formed integrally with the tubular portion 22. The tubular portion 22 of the sub-housing 20 is inserted to the main housing 10 until the flange portion 24 rests on the flange portion 14 of the main housing 10, and the sub-housing 20 is then fixed to the main housing 10 by screws 26a and 26b made of a non-magnetic material, whereby a tubular chamber 28 is formed between the main housing 10 and the sub-housing 20.

The sub-housing 20 has an axial boss portion 30 in which an opening 31 extending coaxially to the direction of the axis of the device is formed therethrough. The opening 31 has a first end opened to the chamber 28 and a second end to which a cap 34 is inserted to seal the chamber 28, in which a magnetic fluid 36 is stored in a fluid-tight manner. As the magnetic fluid, an iso-paraffine containing particles having a very small diameter, such as those provided by manganese-zinc ferrite, suspended therein can be employed.

Figure 4:
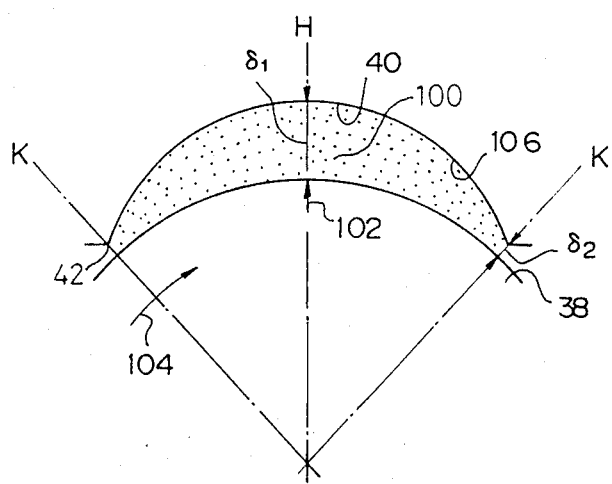
FIG. 4 is an enlarged view of the recess shown in FIG. 1.

Numeral 38 denotes a disk magnet arranged in the space 28 together with the magnetic fluid 36, so that the axis of the disk magnet 38 extends coaxially with respect to the axis of the device. The permanent magnet disk 38 is radially magnetized to provide a number of poles equal to the number of recesses 18a, 18b, 18c, and 18d. As will be easily seen from FIG. 1a, a pair of facing north poles N and a pair of facing south poles S are obtained, and these pairs of N-poles and S-poles are spaced at an angle of 180 degrees from each other. The disk 38 has an axial thickness which is slightly smaller than the axial length of the tubular space 28. As shown in FIG. 4 each of the recesses 18a, 18b, 18c and 18d forms a recessed portion 40 which is farthest from the surface of the disk 38 and along the normal direction of the poles, to generate a returning force, and a projected portion 42 which is nearest to the surface of the disk 38 and located between adjacent N and S poles, to generate a holding force which prevents a rotation of the disk magnet. Namely, two pairs of diametrically opposite returning force generating portions 40 and two pairs of diametrically opposite holding portions 42 are provided.

At angular positions adjacent to the poles, the local density of the magnetic fluid 36 becomes high, so that a magnetic and viscous elastic force is generated between the returning force generating portions 40 and facing poles of the disk magnet, to hold the disk magnet 38 in a neutral position. When an acceleration takes place, the disk magnet 38 is moved in the radial direction thereof corresponding to the direction of acceleration to a position at which the above magnetic and viscous elastic force is equal to the inertial force applied to the disk magnet 38 due to the acceleration.

The projected portions 42, which are arranged along a normal axis K—K located between the pole axis H—H, are spaced from the surface of the disk magnet 38 at a distance $\delta_2$ which is smaller than the distance $\delta_1$ by which the portions 40 are spaced from the disk magnet 38, and as a result, the disk magnet 38 cannot rotate about its own axis, as will be fully described later.

As will be easily seen from FIG. 2, the magnetic fluid is introduced into the tubular space 28 via the opening 31, the plug 34 is fitted to the boss portion 30, and a cap 44 is fitted to the plug 34 and the free end of the boss portion 30, whereby the magnetic fluid is sealed in the tubular space 28. This fluid-tight sealing is assisted by an O-ring 46 arranged between the main housing 10 and the sub-housing 20.

As shown in FIG. 1a, the main housing 10 forms circumferentially spaced cut-out portions 49a, 49b, 49c, and 49d which are opened outwardly at their circumferential outer ends and axial ends spaced from the flange portion 14. Numerals 50a, 50b, 50c, and 50d represent Hall elements used as magnetic sensors, and arranged in the cut-out portions 49a, 49b, 49c, and 49d, respectively.

These Hall elements 50a, 50b, 50c and 50d are fixedly connected to the outer surface of the main housing in the respective cut-out portions 49a, 49b, 49c, and 49d, so that the portions 49a, 49b, 49c, and 49d are spaced apart from the recesses 18a, 18b, 18c, and 18d, respectively, by a predetermined distance.

A printed circuit board 52 made of a material having a glass-epoxy resin base is fixed to the main housing 10 by a screw 53 made of a non-magnetic material. Each of the Hall elements 50a, 50b, 50c, and 50d is provided with lead members which are connected to the printed circuit board 52 by soldering. A circuit portion 54 is formed on the printed circuit board 52 in the usual manner.

A shield cover 56 is made of a steel and is connected to the main housing 14 by a fixing means such as screws, not shown in the drawing. The shield cover 56 has a tubular portion 56-1 which is tightly fitted to the main housing 10 and sub-housing 20, and a cap portion 56-2 having a diameter smaller than that of the tubular portion 56-1 and arranged around the cap member 44. The shield cover 56 also has bottom tongue portions 56-3 which rest on a shield plate 58 and are connected thereto by a screws 60. The shield cover 56 and shield plate 58 form an outer construction of the acceleration sensor according to the present invention.

The tubular portion 56-1 of the shield cover 56 has an opening 56-4 to which a grommet 62 made of rubber material is fitted, and a wire harness 64 from a not shown outside control circuit to which the acceleration rate information is sent is passed through the grommet 62 so that the lead wires of the harness 64 can be connected to a processing circuit 54.

Figure 3:
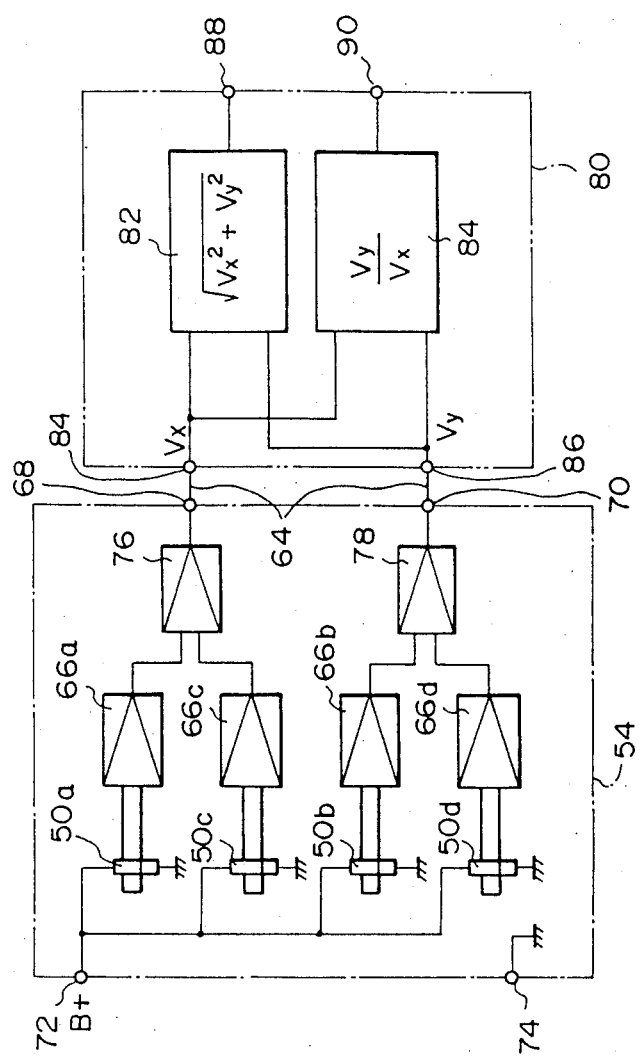
FIG. 3 is a block diagram of the control circuits connected to the sensor according to the present invention.

As shown in FIG. 3, the processing circuit 54 is provided with terminals 68 to 72 to which the wire harness 64 is connected. The processing circuit 54 is further provided with differential amplifiers 66a, 66b, 66c, and 66d having inputs connected to the Hall elements 50a, 50b, 50c, and 50d, respectively. As is well known, each Hall element has two outputs connected to the respective one differential DC amplifier, as will be described later, from which an electric signal corresponding to the magnitude of the magnetic field is obtained. These Hall elements 50a, 50b, 50c, and 50d are connected to the terminal 72 which is connected to a power supply (not shown). The terminal 74 is grounded. The processing circuit 54 further has two differential amplifiers 76 and 78. The amplifier 76 has two inputs connected to outputs of the amplifiers 66a and 66c connected to the opposite pairs of the Hall elements 50a and 50c, respectively, and the amplifier 78 has two inputs connected to outputs of the amplifiers 66b and 66d connected to the opposite pairs of the Hall elements 50b and 50d, respectively. The outputs of the amplifiers 76 and 78 are connected to the terminals 68 and 70, respectively.

In FIG. 3, 80 denotes an outside processing circuit connected by the wire harness 64 to the processing circuit 54. The outside processing circuit 80 includes a square averaging circuit 82 and a calculating circuit 84 which is, for example, a multi-function generator, model 4302, available from the BAR-BRAUN (phonetic) Company. The circuit 84 is provided so that use can be made of its vector function dividing operation. The square averaging circuit 82 and the calculating circuit 84 are provided with two inputs connected respectively to terminals 84 and 86 which are connected, via the harness 64, to the terminals 68 and 70, respectively, of the inner processing circuit 54. The square averaging circuit 82 and the calculating circuit 84 are provided with outputs connected, respectively, to output terminals 88 and 90.

Figure 1B:
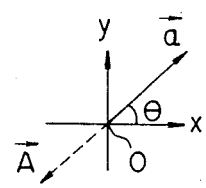
FIG. 1b shows the plane in which an acceleration takes place, which corresponds to the plane of the magnet disk in FIG. 1.

The operation of the first embodiment will be described. First, it should be noted that, in this embodiment, the sensor is arranged in a position of the body at which only a translation motion is substantially generated, and a rotational movement does not substantially occur. For example, the sensor is arranged on the center of the gravity of vehicle, when the sensor is used to detect acceleration by the translational movement. The disk magnet 38 (FIG. 1) in the magnetic fluid 4 generates a magnetic field, to vary a local density of the magnetic fluid in accordance with a gradient of the magnetic field. These portions of locally increased density of the magnetic fluid, which are housed in the recesses 18a–18d, generate a magnetic viscous elastic force at the housings 10 and 20 to control the two-dimensional, i.e., X and Y positions as shown in FIG. 1b, of the disk magnet 38 in accordance with the two-dimensional acceleration force applied thereto, whereby the two-dimensional acceleration rate can be detected from the X and Y positions of the disk magnet 38. The operation for detecting the two-dimensional acceleration rate will now be more fully described.

The disk magnet 38 is radially magnetized and floats in the magnetic fluid 36, since magnetic viscous elastic forces supporting the disk magnet 38 are generated at equiangularily spaced locations along the disk magnet 38 corresponding to the N and S poles at which the local density of the magnetic fluid reaches a maximum value. The local density of the magnetic fluid adjacent to the outer periphery of the disk magnet 38 in the tubular space 28 becomes larger nearer to the poles, and becomes smaller away from the poles.

When an acceleration $\vec{a}$ (FIG. 1b) is applied in a direction in the plane of the disk magnet 38, an inertial force is generated in the disk magnet 38 and urges the disk magnet 38 to move relative to the main housing 10. When the disk magnet 38 is moved, a magnetic viscous elastic returning force is generated due to the equiangularly spaced locally increased density portions of the magnetic fluid. The disk magnet 38 will be brought to a standstill at a position at which the returning force and the inertia force are balanced, and as a result, a signal corresponding to the accelerating rate $\vec{a}$ is obtained by detecting the position of the disk magnet 38 in the tubular space 28. The Hall elements 50a, 50b, 50c and 50d detect the position of the magnet disk 38.

If the disk magnet 38 is easily rotatable, the position of the disk magnet 38 is varied, which causes the level of the acceleration rate signal to be varied accordingly, making a detection of the acceleration rate impossible. Therefore, according to the present invention, means are provided for preventing a rotation of the disk magnet 38. As described before, the sensor of this embodiment is arranged on the portion of the vehicle where only a translational speed substantially takes place. Nevertheless, a small component of rotational movement may occur, and this means opposes the small inertial force caused by the component of rotational movement, and prevents the disk 38 from being rotated This means comprises the recesses 18a, 18b, 18c, and 18d, which enables the magnetic viscous elasticity to be generated not only in the radial direction but also in the circumferential direction. As already explained, the portions of locally increased density of the magnetic fluid are formed adjacent to the poles of the disk magnet 38. Equiangulary spaced small gaps $\delta_2$ (FIG. 4) are provided between the adjacent recesses 18a, 18b, 18c and 18d, so that a large magnetic viscous elastic force is generated in a circumferential direction between the sides of the recesses 18a, 18b, 18c, and 18d adjacent to the portions 42, which prevents a rotation of the disk magnet 38 about its own axis. As shown in FIG. 4, a portion 100 of locally increased density of the magnetic fluid is formed adjacent to the pole 102, in the recess, and when the disk magnet 38 is urged to rotate about its own axis in a direction shown, for example, by an arrow 104, this portion of locally increased density engages the surface 106 of the recess adjacent to the portion 42 which is the nearest to the disk magnet 38 and extends so as to intersect same in the circumferential direction, so that rotation of the disk magnet 38 is blocked. Accordingly, since the rotational movement of the disk magnet 38 is blocked, the disk magnet 38 can move only in the radial direction toward the recess.

Figure 5:
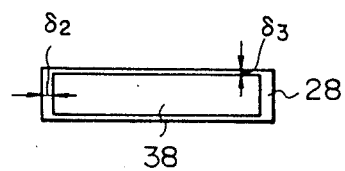
FIG. 5 is a view showing axial and circumferential gaps in the first embodiment.

It should be noted that a means is further provided to substantially present an axial movement of the disk magnet 38 in the tubular space 28, to ensure a sensitivity thereof to acceleration only in the direction of the plane of the disk magnet 38. For this purpose, as shown in FIG. 5, the distance $\delta_3$ between the facing surface of the disk magnet 38 and the main housing 10 and sub-housing 20 in the axial direction is smaller than the distance $\delta_2$. The magnetic field is located not only in the area outside of the circumferential side of the disk magnet 38 but also in the area outside of the axial side of the disk magnet 38, and thus the magnetic fluid having a high density fills the small axial gap $\delta_3$ between the facing axial sides of the disk magnet 38 and the housings 10 and 20, which enables movement in the axial direction of the disk magnet 38 to be constrained during the acceleration.

As described above, according to this embodiment, the multi-pole disk magnet 38 is arranged in the tubular housing 28 in which the magnetic fluid 36 is filled, and the tubular housing 28 is provided with the same number of recesses 18a, 18b, 18c and 18d as that of the poles of the disk magnet 38, and are arranged to face the poles, respectively. Furthermore, the length of the tubular space 28 in the direction of the disk magnet 38 where there are not magnetized is slightly longer than the length of the disk magnet 38 itself, and as a result, (1) the disk magnet 38 can be floatingly supported by the magnetic fluid in the tubular space 28, (2) the disk magnet 38 is opposed by the returning force to maintain a neutral position under the magnetic viscous elasticity, and (3) rotation of the disk magnet 38 is prevented.

Accordingly, when an acceleration occurs in the plane of the disk magnet 38, a unique position of the disk magnet 38, i.e., a unique position of each of the poles of the disk magnet 38, is obtained. This means that a detection of the position of the poles by a magnetic field detection means, such as the Hall elements, enables a detection of the acceleration rate.

The principle of the detection of the acceleration rate according to the present invention will be described in more detail. In FIG. 1b the x-axis corresponds to the normal line on which the diametrically opposite pair of recesses 49a and 49c are located, and the y-axis corresponds to the normal line on which the diametrically opposite pair of recesses 49b and 49d are located. In this case, as already explained, four poles are provided such that diametrically opposite S poles are located on the x-axis and diametrically opposite N poles are located on the y-axis. When an acceleration $\vec{A}$ is generated, the main housing 10 is subjected to the acceleration $\vec{a}$ as a vector having of the same magnitude although the direction thereof is reversed. When the weight of the disk magnet 38 is m, the inertia force $\vec{F_1}$ applied to the disk magnet 38 is expressed by $$\vec{F_1} = k_1 \times m \times \vec{a}$$

where $k_1$ is a constant determined by various factors, and the magnetic elastic force $\vec{F_2}$ has the same value as the inertia force $\vec{F_1}$ but in the opposite direction.

Assuming that, in FIG. 1b, 0 is designated as the origin of the coordinates corresponding to the plane of the disk magnet 38, and P(x,y) is the position of the center of the disk magnet 38 at which the magnetic elastic force $\vec{F_2}$ and the inertia force $\vec{F_1}$ are balanced, then in this case, if the amount of movement of the disk magnet 38 is small, the following equation is obtained.

$$|\vec{F_2}| = k_2 \times \sqrt{x^2 + y^2},$$

where $k_2$ is a constant. Assuming that $|\vec{F_1}| = |\vec{F_2}|$ $$|\vec{a}| = (k_2/(k_1 \times m)) \times \sqrt{x^2 + y^2}$$

thus, $$P(x,y) = (k \times |\vec{a}| \times \cos \theta, k \times |\vec{a}| \times \sin \theta),$$

where $k = k_2/(k_1 \times m)$, and therefore, the acceleration rate can be determined from the position of the magnet disk P(x,y).

To detect the acceleration rate under the above-mentionbed principle, the pair of Hall elements 50a and 50c are arranged opposite to the S-poles of the disk magnet 38, whereby the output levels from the Hall elements 50a and 50c are further increased as they move closer to the corresponding S-poles. The pair of Hall elements 50b and 50d are arranged to be opposite to the N-poles of the disk magnet 38, whereby the output levels from the Hall elements 50b and 50d are further increased as they move closer to the corresponding N-poles. In FIGS. 1a and 1b, when the disk magnet 38 is moved along the x-axis, a S-pole facing thereto is moved toward the Hall element 50a, causing the output level of the Hall element 50a to increase and the output level from the diametrically opposite Hall element 50b to decrease, since the S-pole facing the Hall element 50b is moved away therefrom. As will be clear from the above, the output level from each of the Hall elements is inversely proportional to the square of the distance between the facing pole and the Hall element.

The differential amplifiers 76 and 78 in FIG. 3 output signals Vx and Vy having a level which corresponds to the difference in the levels of the diametrically opposite pairs of Hall elements 50a and 50c, or 50b and 50d, to obtain a high gain value and good linearity and temperature correction. For this purpose, the difference between the signal levels from the diametrically opposite pair of Hall elements i.e., 50a and 50c is calculated, and is proportional to the x-component of the position of the disk magnet 38 if the displacement of the disk magnet 38 is small. Similarly, the difference between the signal levels from the other diametrically opposite pair of Hall elements, i.e., 50b and 50d, is calculated and is proportional to the y-component of the position of the disk magnet 38.

The circuit 82 in the outside processing circuit 80, based on the differential voltage Vx and Vy, the square average value, calculates $\sqrt{Vx^2 + Vy^2}$, and calculates the ratio Vy/Vx; the former corresponds to the magnitude a of the acceleration and the latter denotes the direction $\tan \theta$ of the acceleration in FIG. 1b.

It should be noted that the amount of magnetic fluid 36 stored in the tubular space 28, which corresponds to the volume of the tubular chamber 28 less the volume of the disk magnet 38, is preferably equal to the total amount of the magnetic fluid 36 which can be held by the disk magnet 38 when it is able to move freely. The total amount of the magnetic fluid 36 which can be held by the disk magnet 38 when able to move freely is the total amount of the magnetic fluid 36 held by the disk magnet 38 and attached thereto when the disk magnet 38 is inserted into a magnetic fluid stored in a vessel under usual temperature and pressure conditions. When the amount of the magnetic fluid filled in the tubular space 28 is larger than this free state amount, a non-sensitive zone will exist in which the output of the sensor does not change even when an acceleration occurs. Conversely, when the amount of the magnetic fluid filled in the tubular space 28 is smaller than the free state amount, the amount of displacement of the disk magnet 38 is relatively reduced, thus lowering the sensitivity of the sensor.

Figure 6:
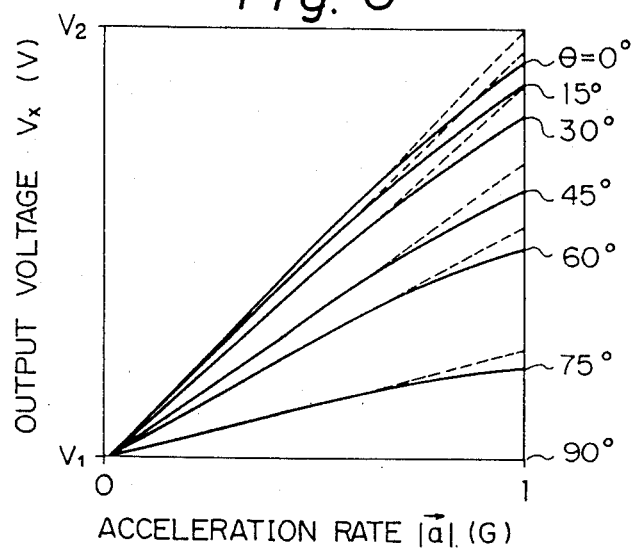
FIG. 6 is a graph showing the relationship between the acceleration rate and an output level Vx.
Figure 7:
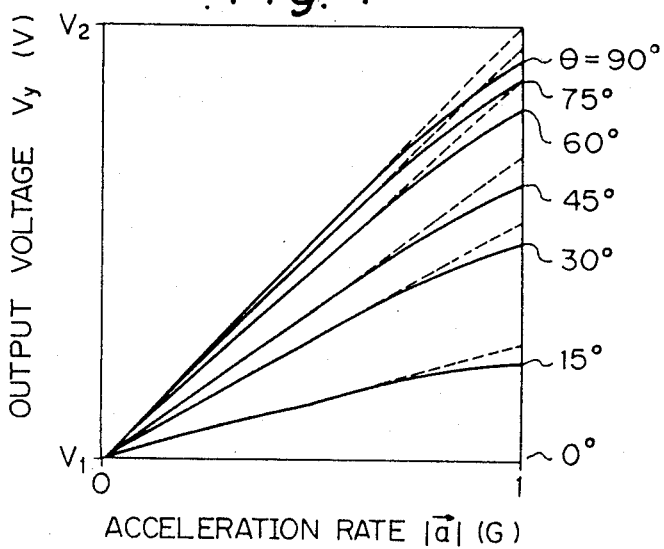
FIG. 7 is a graph showing the relationship between the acceleration rate and an output level Vy.

In FIG. 6, dotted lines show the calculated relationships between the magnitude and the differential output Vx from the diametrically opposite Hall elements 50a and 50c, and in FIG. 7 dotted lines show the calculated relationships between the magnitude and the differential output Vy from the diametrically opposite Hall elements 50b and 50d. In FIGS. 6 and 7, $\theta$ as a parameter is the angle of the direction of the acceleration, and Vx is expressed by a $\cos \theta$ while Vy is expressed by a sine $\theta$. The solid lines in FIGS. 6 and 7 are values actually obtained.

Figure 8:
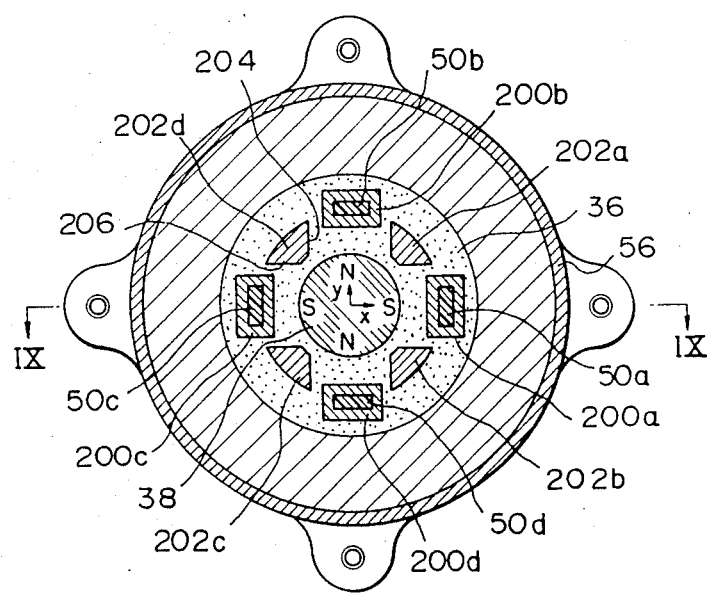
FIG. 8 is a lateral cross sectional view of the sensor device according the second embodiment of the present invention, taken along the line VIII—VIII in FIG. 9.
Figure 9:
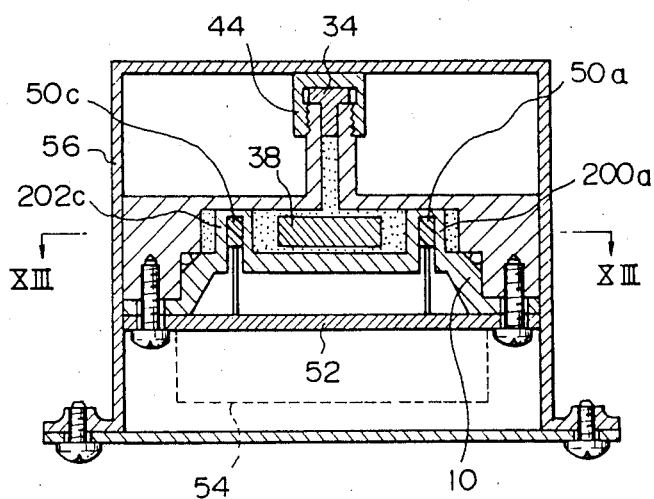
FIG. 9 is a longitudinal cross sectional view taken along the line IX—IX in FIG. 8.

FIGS. 8 and 9 shows a second embodiment in which, in place of the recesses 49a, 49b, 49c and 49d of the first embodiment, returning force generating portions and holding portions are separately provided. Parts having a similar purpose are designated by the same reference numerals, and therefore, a detailed explanation thereof is omitted. The main housing 10 includes a plurality of projections 200a, 200b, 200c and 200d as returning force generating portions, which are equiangularly spaced from each other. These portions each form a rectangular shaped tube, in which the Hall elements 50a, 50b, 50c and 50d are arranged respectively. The housing 10 is also provided with projections 202a, 202b, 202c, and 202d which are located between adjacent portions 200a, 200b, 200c and 200d. These portions 202a, 202b, 202c and 202d each form a sector cross sectional shape located near the outer surface of the disk magnet 38, and define a pair of walls 204 and 206 extending in directions which enable the rotating force applied to the magnetic fluid to be prevented.

By this circumferential alternate arrangement of the returning portions 200a, 200b, 200c, and 200d and the rotating stoppage portions 202a, 202b 202c and 202d, the disk magnet 38 can be moved only in the x and y axis on which the N-poles and S poles are located, respectively, and rotation of the disk magnet 38 is prevented by the stopping portions. As a result, this embodiment allows an accurate detection of the acceleration rate without the influence of a rotation of the disk magnet 38.

Figure 10:
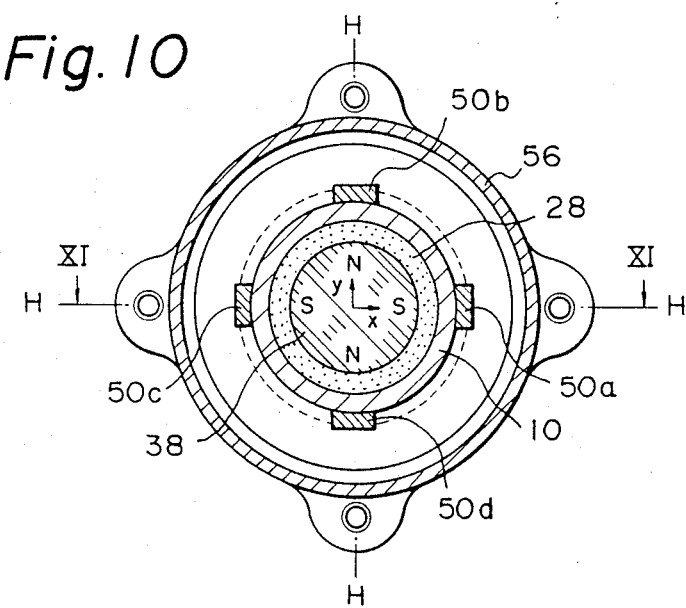
FIG. 10 is a lateral cross sectional view of the sensor device according the third embodiment of the present invention, taken along the line X—X in FIG. 11.
Figure 11:
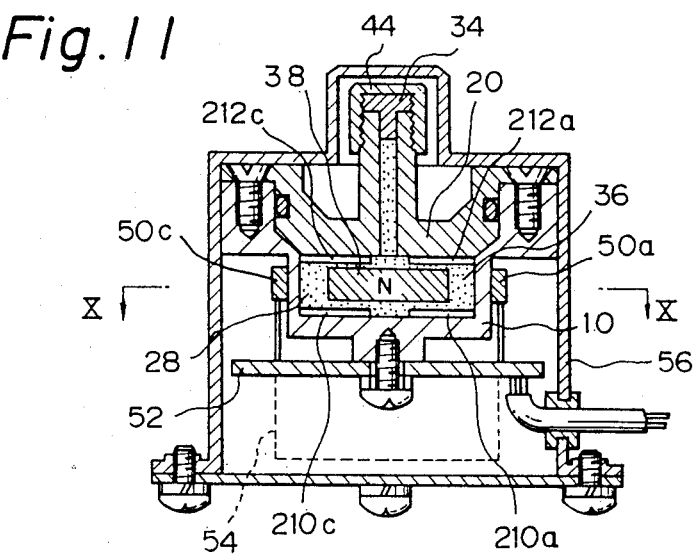
FIG. 11 is a longitudinal cross sectional view taken along the line, XI—XI in FIG. 10.
Figure 12:
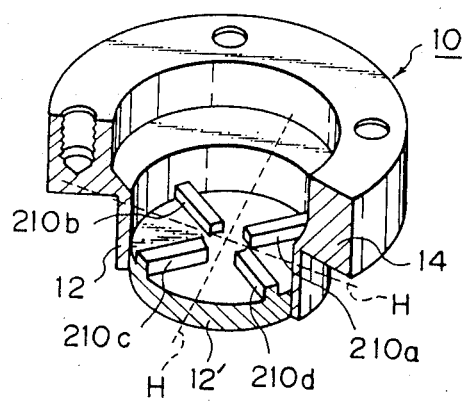
FIGS. 12 and 13 are perspective views showing the main housing and sub-housing respectively, in the third embodiment of FIG. 10.
Figure 13:
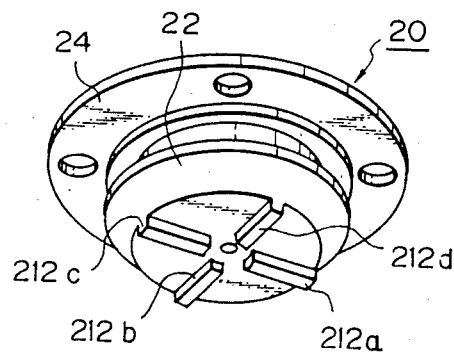

FIGS. 10 and 11 show a third embodiment in which circumferentially spaced returning force generating portions and holding portions are formed on the end surfaces of the main housing 10 and the sub-housing 20. In this embodiment, parts having a similar purpose are designated by the same reference numerals, and therefore, a detailed explanation thereof is omitted. As shown in FIG. 12, the main housing 10 has a tubular portion 12 having a closed bottom 12' at one axial end and a flange portion 14 formed integrally with the tubular portion 12 at the other axial end thereof. The bottom (one axial end) of the tubular portion 12 is provided with two pairs of diametrically opposite radial projections 210a and 210c and 210b and 210d. The sub-housing 20 is also provided with a tubular portion 22 and flange portion 24, and the tubular portion 22 has a bottom (axial end surface) on which two pairs of diametrically opposite radial projections 212a and 212c and 212b and 212d are formed. These housings 10 and 20 are connected so that the axial end surfaces thereof face the respective axial end surfaces of the disk magnet 38 as shown in FIG. 11, so that the projections are axially spaced apart by the disk magnet 38. The normal lines H on which the N-poles and S-poles are located, respectively, are radially located as shown by dotted lines in FIG. 13, between adjacent pairs of opposite projections.

Figure 14:
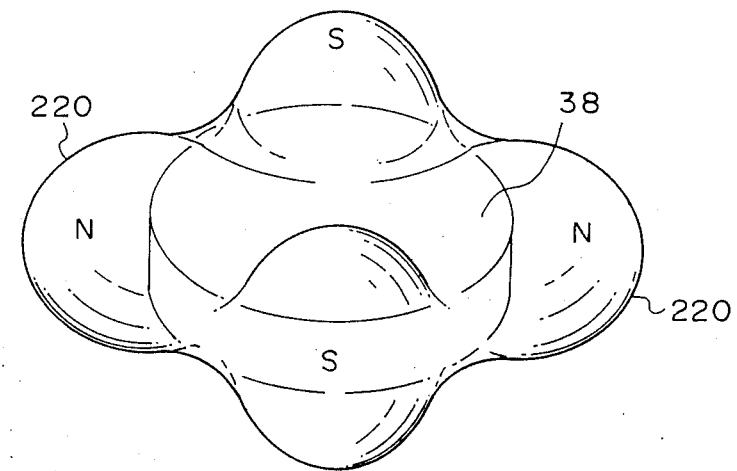
FIGS. 14 and 15 are a perspective view and cross-sectional view respectively, showing the portion of increased density of the magnetic fluid formed adjacent to the poles.
Figure 15:
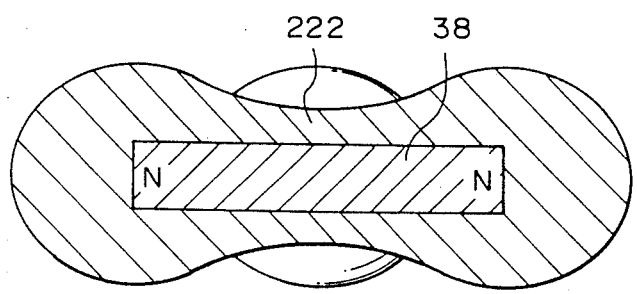

FIGS. 14 and 15 show how the magnetic fluid is magnetized around the poles of the disk magnet 38. The fluid when magnetized forms substantially spherical shape portions 220 around the each of the poles, which are connected by an intermediate portion 222 having a small thickness and radially spaced from the spherical portions, and located in the center of the disk 38. These portions of locally increased density of the magnetic fluid, which are extended along the normal lines H (FIG. 10), are arranged in the space formed between the adjacent projections 210a, 210b, 210c and 210d on the axial end surface of the housing 10 facing the disk 38, and between the adjacent projections 212a, 212b, 212c and 212d on the axial end surface of the housing 20 facing the disk magnet 38. As a result, when the disk magnet 38 is urged to rotate, these projections 210a, 210b, 210c and 210d, and 212a, 212b, 212c and 212d generate a force opposing this rotation, and accordingly, rotation of the disk magnet 38 is prevented in the tubular space.

In this embodiment, the magnetic viscous elastic force is applied in the portion of the magnetic fluid having an increased density around the poles of the disk 38, between the facing surfaces of the disk magnet 38 and the housing 10, to balance the inertial force applied to the disk magnet 38 in the x-y plane when an acceleration is applied to the disk magnet 38 in the x-y plane, and as a result, the disk magnet 38 takes a position P(x, y) at which the magnetic force and the inertial force are balanced. Similar to the first embodiment, the axial distance between the facing axial end of the housing 10 and the disk magnet 38 is smaller than the distance between the facing circumferential sides of the housing 10 and disk magnet 38, to ensure sensitivity in only the x-y plane. To obtain signals indicating the x-y position of the disk 38, opposite pairs of Hall elements 50a, and 50c, and 50b and 50d are provided on the radial lines H on which the poles of the disk magnet 38 are arranged.

Figure 18:
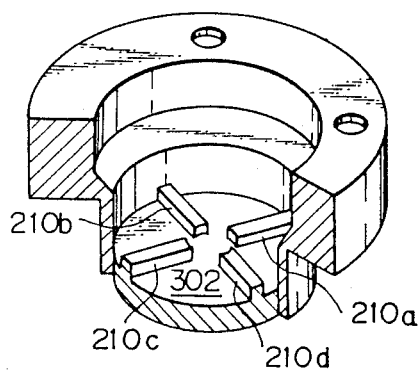
Figure 19:
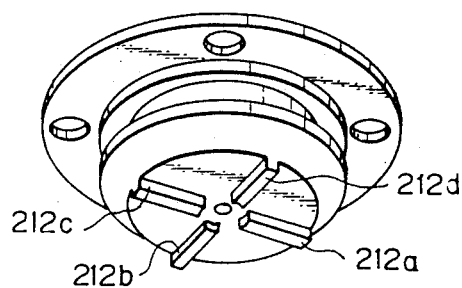

A fourth embodiment is shown in FIGS. 16a and 17, in which the rate of acceleration is detected by rotating the disk magnet 38. As shown in FIG. 18, projections 210a, 210b, 210c and 210d are formed on the axial bottom surface of the main housing 10 and the projections 212a, 212b, 212c and 212d are formed on the axial top wall of the sub-housing 20. These projections 210a, 210b, 210c and 210d on the bottom wall and the projections 212a, 212b, 212c and 212d on the axial top wall are arranged to face each other, whereby four pairs of axially opposite projections 210a and 212a, 210b and 212b, 210c and 212c, and 210d and 212d are provided.

The number of poles of the disk magnet 38 is the same as the number of pairs of projections, and the thickness of the disk is slightly smaller than that of the tubular space 28 in the axial direction, less the axial thickness of the projection. The diameter of the disk magnet 38 is slightly smaller than the inner diameter of the tubular space 28. The difference between the diameter of the disk magnet 38 and the inner diameter of the tubular space 28 is the same as that between the axial thickness of the disk magnet 38 and the axial thickness of the space 28.

An annular slit 300 (FIG. 16a) is formed between the housing 10 and the disk magnet 38, and the thickness $\delta_3$ of the slit 300 is small enough to prevent a translation movement of the disk magnet 38. As already described with reference to the previous embodiment, portions of locally increased density of the magnetic fluid are formed adjacent to the poles of the disk magnet 38. The annular slit 300 of the small thickness allows these portions to generate a large magnetic viscous elastic force between the poles of the disk magnet 38 and the inner circular wall of the housing 10 as a translation prohibition, so that any translational movement of the disk magnet 38 is controlled. Radial sector regions 302 (FIG. 18), each having an axial thickness wider than the annular slit 300, are formed between the axially facing walls of the disk magnet 38 and the main housing 10, and the disk magnet 38 and the sub housing 20. The projections 210a–d and 212a–d are formed between the sector portions and project toward the disk magnet 38 to form a slit 304 (FIG. 16a) between the projections and the disk magnet 38. These projections are arranged along the intermediate normal lines K (FIG. 16a) between the normal lines H on which the poles of the disk magnet 38 are located. The projections 210a–d and 212a–d provide a returning force to the rotational movement of the disk magnet 38 which takes place in accordance with the rate of the rotary acceleration applied in the x-y plane of the disk magnet 38. A pair of diametrically opposite Hall elements 50a and 50b (FIG. 16a) are arranged on one of the intermediate radial lines K to detect the angular position of the disk magnet 38.

Figure 20:
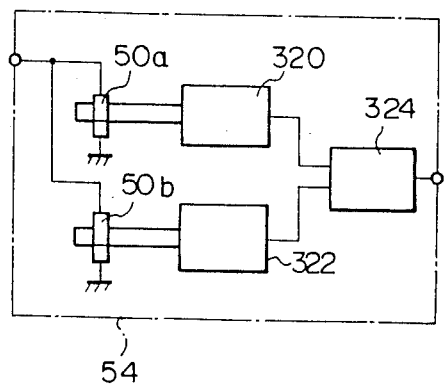

FIG. 20 is a block diagram of a processing circuit 54 of the fourth embodiment. The processing circuit 54 includes two differential amplifiers 320 and 322, having inputs connected to the Hall elements 50a and 50b, respectively, and a differential amplifier 324 having two inputs connected to the outputs of the amplifiers 320 and 322, respectively.

In the operation of the embodiment shown in FIGS. 16 to 20, when the disk magnet 38 is subjected to an acceleration $\vec{a}$, an inertia force is applied to the disk magnet 38 to urge it to be rotated about an axis of the housing 10. Since the portions of the magnetic fluid having a locally increased density are opposed by the projections 210a–210d and 212a–212d as the returning torque generating portions, a magnetic viscous returning torque is generated and imposed on the disk magnet 38, and as a result, the disk magnet 38 is brought to a standstill at an angular position at which the magnetic viscous elastic force is balanced by the inertia torque. Namely, a signal corresponding to the acceleration rate can be obtained by detecting the angular position of the disk magnet 38 in the tubular space 28. The detection of the angular position of the disk magnet 38 is carried out by the Hall elements 50a and 50b.

If the disk magnet 38 can freely obtain a translation movement in the plane parallel to the disk magnet 38 itself, the rotary acceleration effect can not be separated from the effect of the linear translation movement. Accordingly, the gap between the inner circumferential wall of the housing 10 and the opposite outer circumferential wall of the disk magnet 38 is such that this translation movement is prevented.

The upper and lower projections are provided on the side surfaces on which the locally increase density portions of the magnetic fluid act to provide a magnetic viscous elastic force, which generates a returning torque imposed on the disk magnet 38. This effect of the locally increased density portions can be obtained between the inner circumferential wall of the housing and the outer circumferential wall of the disk magnet 38 whereby the translation movement in the tubular space 28 can be effectively prevented, and as a result, the disk magnet 38 can only rotate in the tubular space 28.

Similar to the previous embodiments, the disk magnet 38 is arranged such that it cannot move in the axial direction. This is not only to prevent the translation movement in the horizontal plane but also to prevent a translation movement in the vertical plane. For this purpose, the distance between the facing circumferential walls of the disk magnet 38 and the tubular space 28 and the distance between the facing axial end walls of the disk magnet 38 and the tubular chamber 28 are substantially equal and have a small value. As already mentioned with reference to FIGS. 14 and 15 in the third embodiment, the portions of the magnetic fluid having the locally increased density are formed not only on the outer peripheral wall of the disk magnet 38 but also on the end walls of thereof. The small distance between the facing peripheral walls and between the facing end walls, together with a proper selection of the axial end surface area of the projections 210a–d and 212a–d permits the locally increased density portions of the magnetic fluid to fill the restricted gap, which prevents movement of the disk magnet 38 in the axial direction due to an axial acceleration.

As described above, according to this embodiment, the disk magnet 38 and magnetic fluid 36 are sealingly arranged in the tubular space 28, and the pairs of diametrically opposite radial projections 210a and 210c, 210b and 210d, 212a and 212, and 212b and 212d, which are the same in number as the poles of the disk magnet 38, are arranged between the facing end walls of the disk magnet 38 and the tubular space 28, and the diameter of the disk magnet 38 is slightly smaller than the inner diameter of the tubular space 28, and the axial length of the tubular space 28 is slightly longer than that of the disk magnet 38. As a result, (1) the disk magnet 38 is floatingly and stably supported in the magnetic fluid 36 filled in the tubular space 28, (2) the disk magnet 38 is subjected to a returning force due to the magnetic-viscous elasticity, and (3), a translation movement of the disk magnet 38 is prevented.

As a result, a unique angular position of the disk magnet 38, i.e., the position of each of the poles, is obtained in accordance with a value of the acceleration rate, and thus the acceleration rate can be determined by a detection of the position of the poles by the magnetic sensor, such as the Hall element.

In FIG. 16b, the x-axis corresponds to the first intermediate axis K on which the Hall elements 50a and 50b are arranged, and the y-axis corresponds to the second intermediate axis K, at an angle of 90 degrees with respect to the first intermediate axis K. In FIG. 16a, when an acceleration is not applied, the disk magnet 38 is held stably at an angular position at which the S-S pole axis forms an angle of 45 degrees with respect to the x-axis, and the N-N pole axis forms an angle of 45 degrees with respect to the y-axis. When an angular acceleration A is applied as shown in FIG. 16b, the angular acceleration $\vec{a}$ is applied to the disk magnet 38 relating to the main housing 10. The angular acceleration $\vec{a}$ has the same magnitude as that of the acceleration A but is in an opposite direction. The inertial torque T1 applied to the disk magnet 38 is expressed as;

$$T_1 = K_1 \times m \times a$$

where m is the weight of the disk magnet 38, and k1 is a constant determined by various conditions.

It should be noted that the magnetic-elastic torque $T_2$ has the same magnitude as the inertial torque $T_1$, but the direction thereof is reversed.

In the horizontal cross-sectional plane of the tubular space 28, the center thereof is center of the rotation, and the origin of the rotation is an angular position at which the line connecting the S-poles of the disk magnet 38 is identical to the line connecting the Hall elements 50a and 50b. When the magnetic-elastic torque $T_2$ is balanced with the inertial torque $T_1$ $$|T_2| = K_2 \times \sin(4\theta).$$

where $P(R, \theta)$ is the position of any one pole of the disk magnet 38 and $K_2$ is a constant.

Assuming that $|T_1| = |T_2|$, in a small value zone of $\theta$, then $$|a| = (K_2/K_1 \times m) \times \theta$$

$$(R, \theta) = (R, |a|/k)$$

where $k=k_2/(k_1\times m)$, and therefore, an angular acceleration can be detected if the position of the pole P(R, $\theta$) is known.

In FIG. 16a, the Hall elements 50a and 50b face the diametrically opposite N-poles of the disk magnet 38, and the Hall element 50a and 50b are arranged so that the positive level of their output is increased as the y are located nearer to the N-pole of the disk magnet 38. Therefore, in FIGS. 16a and 16b, when the disk magnet 38 is rotated in the direction $\theta$, N-poles of the disk magnet 38 is moved toward the Hall element 50a, causing an increase in the output level thereof. This output level is almost proportional to the square of the distance between the Hall element and the pole.

Therefore, a sum of the outputs of the Hall elements 50a and 50b is almost proportional to the position of the pole, if the angular displacement of the disk magnet 38 is small, and this allows an increased gain. Furthermore, even if a translational movement of the disk magnet 38 occurs, the output of the Hall element 50a is increased and the output of the Hall element 50b is accordingly decreased, so that the summation realizes only a small change. Thus, it is possible to obtain a signal from the terminal of the processing circuit, having a level which corresponds to the acceleration rate.

Figure 21:
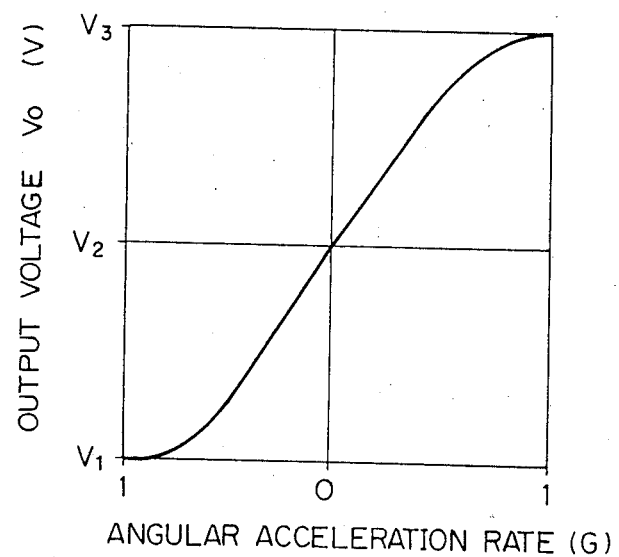
FIG. 21 shows the relationship between the angular acceleration rate and the output level from the sensor of fourth embodiment of FIG. 16a; and, FIG. 22 is a perspective view of another modification of the present invention.

FIG. 21 shows a relationship between the acceleration rate as applied and the output level $V_0$ from the amplifier 324. In this graph, $\theta$ is an angle between the S—S axis and the X-axis.

In the fourth embodiment, two pairs of poles and two pairs of diametrically opposite projection are provided, but this is not restricted thereto if the number of the pairs of poles is equal to or more than 2, and the number of pairs of projections is equal to or more than 1.

Although two Hall elements are provided as magnetic sensors, this is not restricted thereto if the number of Hall elements is equal to or more than 1, and the position thereof is not limited.

Figure 22:
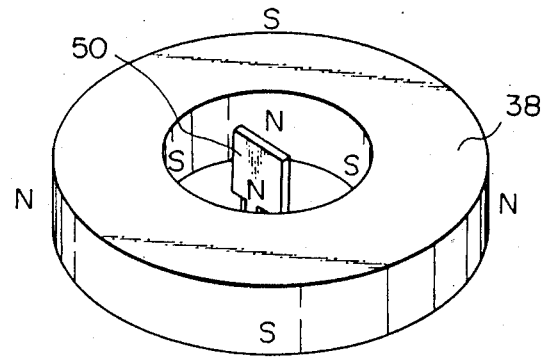

As shown in FIG. 22, the disk magnetic 38 may have an annular shape, and magnetic sensor 50 can be arranged in a space inward of the annular disk magnet 38.

It should be noted that, throughout the embodiments, the Hall element can be replaced by another type of magnetic sensor, such as a magnetic resistance element or coil.

Although the above embodiments have been described with reference to the attached drawings, many modifications and changes can be made by those skilled in this art without departing from the scope and spirit of the present invention.

We claim:

1. A sensor for detecting an acceleration, comprising:
   a housing made of a non-magnetic material and defining therein a chamber having a substantially tubular shape, said chamber defining a circumferential wall and axially spaced side walls;
   a magnetic fluid stored in said tubular chamber;
   a disk-shaped permanent magnet arranged in said tubular chamber, said disk magnet defining a circumferential outer wall and axially spaced side walls, and said disk magnet having angularly spaced pole portions which form a magnetic field adjacent thereto so that portions having a locally increased density of the magnetic fluid are formed adjacent to said pole portions along the circumferential outer wall and side walls of the disk magnet;
   magnetic sensor means fixedly mounted on the housing for detecting changes in a magnetic flux from said pole portions of the disk magnet opposite to the sensor means, caused by a movement of the disk magnet relative to the housing;
   said magnetic sensor means sensing a position of the disk magnet at which an inertia of the disk magnet generated by the acceleration is balanced by a magnetic viscous elastic force of the magnetic fluid caused by said locally increased portion of the magnetic fluid in the chamber between circumferential outer wall of the disk magnet and the circumferential wall of the chamber;
   a spacing between the facing axially spaced side walls of the disk magnet and the chamber being such that axial movement of the disk magnet is substantially prevented, and:
   means for limiting movement of the disk magnet so that substantially only a kind of movement of the disk magnet relative to the housing in the plane of the disk magnet when an acceleration takes place can be obtained, thereby enabling a precise detection of a rate of the acceleration by the magnetic sensor means.

2. A sensor according to claim 1, wherein said limiting means comprise a means formed integrally with the housing for defining angularly spaced projections located between adjacent said pole portions of the disk magnet, said projections defining holding walls extending so as to substantially intersect the circumferential direction of the disk magnet, whereby rotational movement of the disk magnet is prevented by the locally increased portion of the magnetic fluid acting on said holding walls, and a translation movement of the disk magnet is allowed.

3. A sensor according to claim 2, wherein said holding walls are arranged radially outwardly from the outer circumferential wall of the disk magnet.

4. A sensor according to claim 3, wherein said holding walls extend integrally from the axially spaced side walls of the chamber.

5. A sensor according to claim 2, wherein said holding walls are located axially outside of the side walls of the disk magnet.

6. A sensor according to claim 2, wherein said magnetic sensor means are arranged so as to provide at least two magnetic sensor means which are spaced from each other by an angle of 90 degrees, and further comprising a circuit for providing a means square value of outputs from the magnetic sensor means spaced at an angle of 90 degrees, and a circuit for obtaining a ratio of the output of a signal from the sensors spaced at an angle of 90 degrees.

7. A sensor according to claim 1, wherein said limiting means comprising a plurality of angularly spaced projections which extend so as to intersect the circumferential direction of the disk magnet, the pole portions of the disk magnet being arranged between the adjacent projections so that a translation movement of the disk magnet is prevented and rotational movement of the disk magnet is allowed until an angular position is reached at which the angular inertia of the disk magnet is balanced by the magnetic viscous elastic force of the locally increased portions of the magnetic fluid between the adjacent projections, to permit a detection of the angular acceleration from the angular position of the disk magnet detected by the magnetic sensor means.

8. A sensor according to claim 7, wherein said angularly spaced projections project integrally from the axially spaced side walls of the chamber toward the opposite axially spaced side walls of the disk magnet.

9. A sensor according to claim 7, wherein said magnetic sensor means are provided on a radial line of the disk magnet and angularly located between a intermediate portion to the equiangularily spaced pole portions having an opposite polarity.

10. A sensor means according to claim 1, wherein the magnetic sensor means comprise a Hall element.

11. A sensor for detecting an acceleration, comprising:
- a housing made of a non-magnetic material and defining therein a chamber having a substantially tubular shape, said chamber defining a circumferential wall and axially spaced side walls;
- a magnetic fluid stored in said tubular chamber;
- a disk-shaped permanent magnet arranged in said tubular chamber, said disk magnet defining a circumferential outer wall and axially spaced side walls, and said disk magnet having angularly spaced pole portions which form a magnetic field adjacent thereto so that portions having a locally increased density of the magnetic fluid are formed adjacent to said pole portions along the circumferential outer wall and side walls of the disk magnet;
- said disk magnet defining a plane perpendicular to the axis of the chamber and being arranged so as to be moved in the plane of the disk magnet to attain either translational or rotational movement;
- magnetic sensor means fixedly mounted on the housing for detecting changes in a magnetic flux from said pole portions of the disk magnet opposite to the sensor means, caused by a movement of the disk magnet relative to the housing;
- said magnetic sensor means sensing a position of the disk magnet at which an inertia of the disk magnet generated by the acceleration is balanced by a magnetic viscous elastic force of the magnetic fluid caused by said locally increased portion of the magnetic fluid in the chamber;
- a spacing between the facing axially spaced side walls of the disk magnet and the side walls of the chamber being such that axial movement of the disk magnet is substantially prevented, and
- means for preventing the disk magnet from attaining the other of the translational or rotational movement.

* * * * *